United States Patent [19]
Pond

[11] 3,902,265
[45] Sept. 2, 1975

[54] FISH LURE AND HOOK CONSTRUCTION

[75] Inventor: Robert B. Pond, Mansfield, Mass.

[73] Assignee: Atom Manufacturing Company, Inc., South Attleboro, Mass.

[22] Filed: June 3, 1974

[21] Appl. No.: 476,095

[52] U.S. Cl. .............................................. 43/42.05
[51] Int. Cl.² ........................................ A01K 85/00
[58] Field of Search............ 43/42.05, 42.04, 42.41, 43/42.08

[56] References Cited
UNITED STATES PATENTS

| | | | |
|---|---|---|---|
| 2,189,958 | 2/1940 | Middlemiss | 43/42.04 |
| 2,190,449 | 2/1940 | Goldammer | 43/42.04 |
| 2,225,676 | 12/1940 | White | 43/42.05 |
| 2,517,299 | 8/1950 | Gaylord | 43/42.05 |
| 2,582,627 | 1/1952 | Gaylord | 43/42.05 |
| 3,514,890 | 6/1970 | Francklyn | 43/42.05 |

*Primary Examiner*—Warner H. Camp
*Attorney, Agent, or Firm*—Salter & Michaelson

[57] ABSTRACT

A fish lure in the form of a small fish having a groove extending along the bottom to the front end and having a hooked stud extending from the front end. A flat baffle slants down from the bottom toward the front end, the baffle having an opening through which the groove extends. A spring-steel wire leader has an upwardly slanted loop at the front end to which the line is tied, and an upwardly slanted loop at the rear end which locks the hook in place. A single large hook is provided with a downwardly slanted loop at the tie end which surrounds the shank of the leader, the leader loop at the rear end surrounding the shank of the hook, thus permitting relative sliding movement between the hook and the leader. The leader passes through the baffle opening with the hook to the rear. The hook and leader are placed in the groove, the lure having recesses for receiving the looped ends of the hook and leader. The front loop of the leader, with the line attached, is mounted on the stud. When a fish strikes, the hook and leader are instantly pulled from the stud and groove free of the lure, the lure being held captive by the leader passing through the baffle opening.

7 Claims, 3 Drawing Figures

FISH LURE AND HOOK CONSTRUCTION

BACKGROUND OF THE INVENTION

Fish lures of all types are as old as fishing itself. Most lures are provided with a multiple hook construction with provisions being made for the fisherman to set the hooks by pulling on the line. The degree of difficulty in removing the lure and the hooks depends on how far the fish has struck and swallowed the lure. Most times, the removal of a multi-hook lure is messy and time consuming.

SUMMARY OF THE INVENTION

The present invention provides a fish lure having a single hook, the hook and line swinging virtually free when the lure is struck and the hook is then set in the fish's mouth. The result is an unencumbered hook which is quick to set and easy to remove. The lure comprises a small realistic plastic fish having a stud extending from the front end, a groove along the bottom, and a baffle slanting down from the bottom with an opening through which the groove passes. A spring-steel wire leader is provided with upwardly slanting loops at each end, the line being tied to one loop and the other loop surrounding the shank of the leader, permitting relative sliding movement between the hook and the leader. The hook and leader are placed in the groove, recesses being provided for accommodating the looped ends. The leader loop with the line attached is mounted on the stud. Now, when a fish strikes, the hook and leader are instantly pulled free of the lure allowing an unencumbered manipulation of the hook to set in the fish for catching and for easy removal. In the meanwhile, the lure remains tethered by the leader passing through the baffle opening.

Other objects, features and advantages of the invention shall become apparent as the description thereof proceeds when considered in connection with the accompanying illustrative drawings.

DESCRIPTION OF THE DRAWINGS

In the drawings, which illustrate the best mode presently contemplated for carrying out the present invention.

DESCRIPTION OF THE INVENTION

Figure 1:
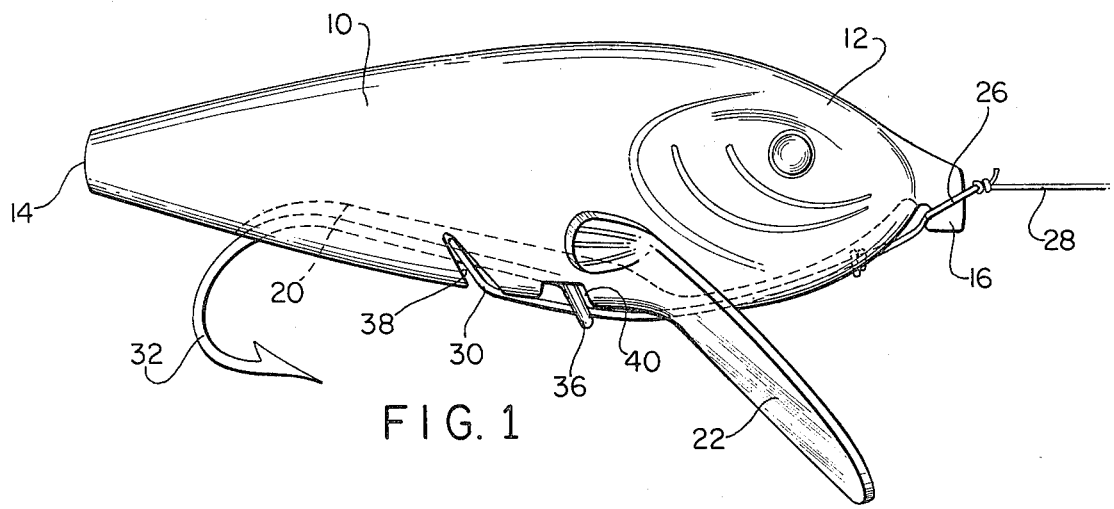
FIG. 1 is a side elevation of a lure and hook assembly of the present invention in set position.

Referring more in detail to the drawings, the lure 10 is in the form of a small fish and is made realistic by a head construction 12 and tail end 14. The lure may be made of plastic in any desired size and color. Extending integrally from the head 12 is a hooked stud 16. The body of the lure is provided with a comparatively deep groove 20 extending from a point spaced from the tail end 14 to the stud 16, dotted lines in FIG. 3. From the gill area in back of the head 12, an integral baffle 22 extends downwardly from the lure with a forward slant. The baffle is provided with a slotted opening 18 through which the groove extends.

Figure 3:
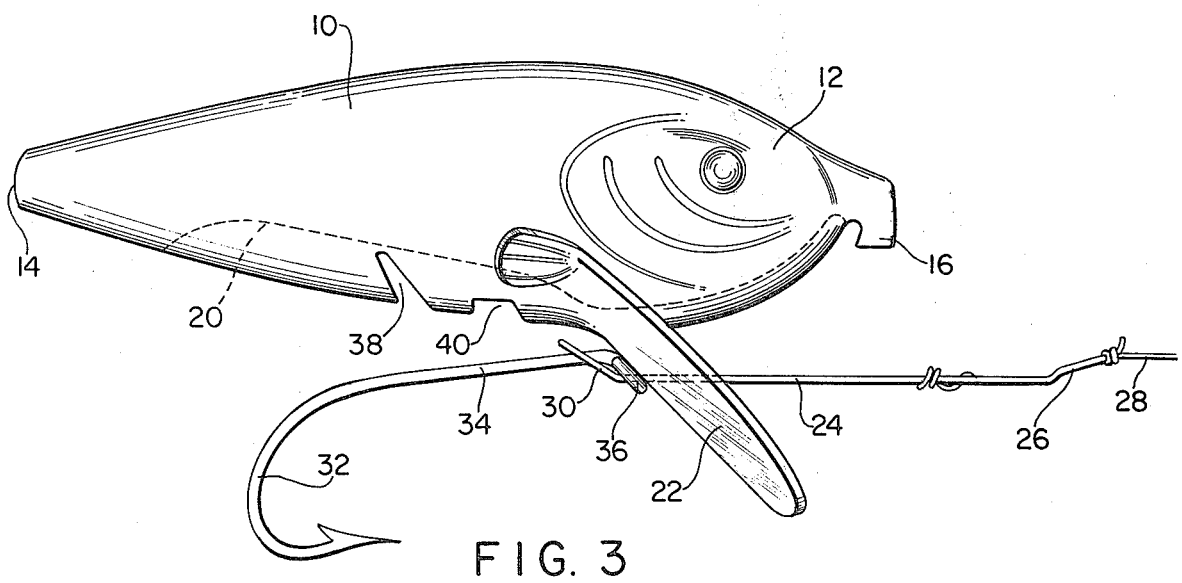
FIG. 3 is a view similar to FIG. 1 with the position of the assembly after the fish strikes.

The hook and line assembly is more particularly shown in FIG. 3. A short spring-steel wire leader 24 is looped at one end to form a slightly upwardly slanting loop 26 to which the fishing line 28 is tied. The leader 24 passes through the slot opening 18 in the baffle 22 and the free rear end of the leader is formed into a loop 30 slanted upwardly. The single large fish hook 32 is provided with a shank 34 terminating in a downwardly slanted loop 36. As can be seen in FIG. 3, the hook loop 36 surrounds the leader 24 while the leader loop 30 surrounds the hook shank 34. This permits relative sliding movement between the hook and the leader.

Figure 2:
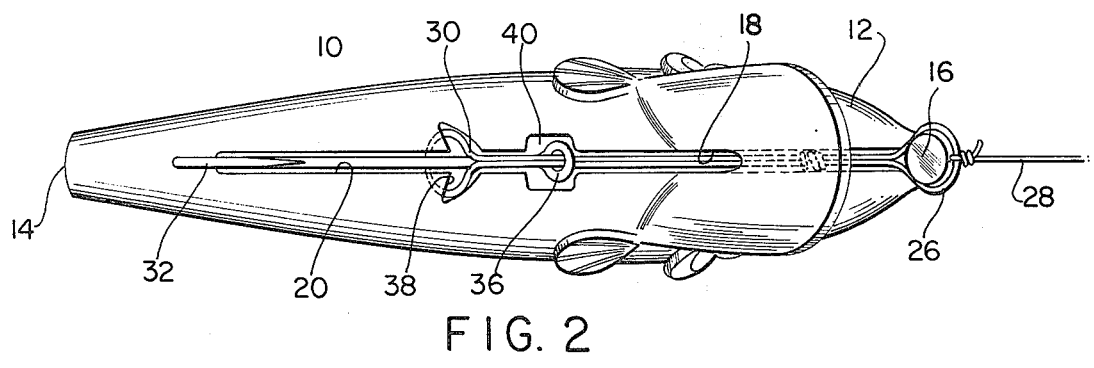
FIG. 2 is a bottom view of the assembly shown in FIG. 1.

The assembly is positioned for fishing as shown in FIGS. 1 and 2. The hook 32 and leader 24 are placed in the groove 20. The body of the lure is provided with recesses 38 and 40 to lockingly receive the loops 30 and 36 in place. At the front of the lure, the loop 26 is positioned over the stud 16 with the line 28 attached, and resiliently grips the stud so as to be releasably maintained thereon.

Now, when a fish strikes the lure, the impact will cause the loop 26 to disengage from stud 16, thus releasing the leader and hook from recesses 38, 40 and groove 20 so that the leader and hook move away from the lure body. Simultaneously, the fisherman gives a quick tug to set the hook. During this movement, the straight line connection from the line 28, leader 24, and hook 32 is unencumbered by the lure 10 which is merely tethered to the assembly by the leader 24 passing through the baffle opening 18, and hence the leader and hook quickly move forwardly until loop 36 engages baffle 22, as shown in FIG. 3. This rapid forward movement of the hook causes the latter to engage the fish's jaw.

The hook and line assembly thus remains free and unencumbered by the lure during the catching of the fish and during the removal of the hook from the fish. The entire assembly, with the single hook arrangement, is simple and easy to assemble. The snell assembly of the hook and line can be packaged and sold detached from the lure and readily mounted by passing the leader through the baffle.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fish lure and hook assembly comprising a lure having a body configured like a fish with a head and tail portion, said body having an elongated groove extending along its underside from a point adjacent said tail portion to said head portion, an integral baffle extending downwardly and forwardly from a point adjacent the back of said head portion, said baffle having an opening therein through which said groove extends, an integral stud member located at the front end of said head portion, a leader having means at its front end releasably engaged with said stud member, said leader being positioned in said groove and extending rearwardly therein through said baffle opening, and a hook having a shank portion seated in said groove and having a hook portion extending downwardly from a point adjacent the rear end of said groove, and means interconnecting the forward end of said shank portion with the rear end of said leader, said leader being constructed of resilient wire whereby when said leader is engaged with said stud member, said leader resiliently maintains said hook positioned in said groove, the engagement of said leader with said stud member being such that when the lure is received within the mouth of a fish, the leader automatically disengages, thus releasing the hook from said groove, whereby a pull on the line connected to the front end of said leader causes the hook and leader to move forwardly with respect to the lure to securely impale the mouth of the fish.

2. The assembly of claim 1 further characterized in that means are provided for limiting the forward movement of the hook and leader relative to the lure.

3. The assembly of claim 1 further characterized in that the means interconnecting the hook and leader permit some degree of relative longitudinal movement therebetween.

4. In the assembly of claim 3, said interconnecting means comprising a loop at the rear end of said leader and a loop at the forward end of said hook shank portion, said leader extending through said hook loop and vice versa.

5. In the assembly of claim 4, said groove being provided with a pair of laterally extending recesses for receiving said loops when the hook and leader are resiliently maintained in said groove.

6. In the assembly of claim 5, said loops permitting relative longitudinal movement between said hook and leader when they are disengaged from said groove, said relative movement being restricted when said loops engage each other, said loops being substantially larger than said baffle opening, thereby preventing disengagement of said leader from said baffle and said lure.

7. In the assembly of claim 1, said means releasably interconnecting said leader with said stud member comprising an eye at the front end of said leader surrounding said stud member, said eye also functioning as means for receiving the end of the line connected to said assembly.

* * * * *